United States Patent
Wang et al.

(10) Patent No.: US 9,420,438 B2
(45) Date of Patent: Aug. 16, 2016

(54) METHOD, SYSTEM AND SERVER FOR FEEDING BACK STATE OF RECEIVING END

(75) Inventors: Jian Wang, Shenzhen (CN); Fangfang Liao, Shenzhen (CN)

(73) Assignee: ZTE Corporation (CN)

( * ) Notice: Subject to any disclaimer, the term of this patent is extended or adjusted under 35 U.S.C. 154(b) by 627 days.

(21) Appl. No.: 13/641,891

(22) PCT Filed: Mar. 3, 2011

(86) PCT No.: PCT/CN2011/071496
§ 371 (c)(1),
(2), (4) Date: Oct. 18, 2012

(87) PCT Pub. No.: WO2012/062070
PCT Pub. Date: May 18, 2012

(65) Prior Publication Data
US 2013/0041967 A1  Feb. 14, 2013

(30) Foreign Application Priority Data
Nov. 9, 2010  (CN) .......................... 2010 1 0538330

(51) Int. Cl.
*H04W 4/14* (2009.01)
*H04W 4/20* (2009.01)
*H04W 8/22* (2009.01)

(52) U.S. Cl.
CPC ........ *H04W 4/14* (2013.01); *H04W 4/20* (2013.01); *H04W 8/22* (2013.01)

(58) Field of Classification Search
CPC ........... H04W 8/30; H04W 8/18; H04W 4/20; H04W 4/22; H04W 8/20; H04W 4/14; H04W 8/22
USPC ......... 709/206; 455/421.2, 433, 528; 370/328
See application file for complete search history.

(56) References Cited

U.S. PATENT DOCUMENTS

| | | | | |
|---|---|---|---|---|
| 6,185,433 | B1* | 2/2001 | Lele et al. | 455/528 |
| 6,917,805 | B1* | 7/2005 | Jang | 455/433 |
| 2008/0310347 | A1* | 12/2008 | Morishige | H04W 68/12 370/328 |
| 2009/0157816 | A1 | 6/2009 | Pattan | |
| 2009/0209234 | A1* | 8/2009 | Bright et al. | 455/412.2 |
| 2011/0264747 | A1* | 10/2011 | Mutikainen | H04L 12/581 709/206 |

FOREIGN PATENT DOCUMENTS

| | | |
|---|---|---|
| CN | 1331524 A | 1/2002 |
| CN | 101047954 A | 10/2007 |
| CN | 101778345 A | 7/2010 |
| WO | 2005114912 A1 | 12/2005 |

OTHER PUBLICATIONS

PCT International Search Report Dated Aug. 11, 2011, Applicant ZTE Corporation, Application No. PCT/CN2011/071496, 4 Pages.
Extended European Search Report Dated Mar. 20, 2014, Application No. 11840501.8-1870 / 2549780 PCT/CN2011071496, Applicant ZTE Corporation, 6 Pages.

* cited by examiner

*Primary Examiner* — David Lazaro
*Assistant Examiner* — Zi Ye
(74) *Attorney, Agent, or Firm* — Brooks Kushman P.C.

(57) ABSTRACT

The present invention provides a method, a system and a server for feeding back the state of a receiving end. The method includes: the server activating the function of feeding back the state of the receiving end for a first terminal (101); after the server receives a short message sent by the first terminal, the server forwarding the short message to the receiving end, and if the short message sent from the receiving end to the first terminal is not received in a preset time period from the moment that the server receives the short message, the server acquiring the current state of the receiving end and feeding back it to the first terminal (102). In the method and system, the first terminal can acquire the current state of the receiving end in the cases that the receiving end is suspended, powered off, or has not registered.

9 Claims, 4 Drawing Sheets

METHOD, SYSTEM AND SERVER FOR FEEDING BACK STATE OF RECEIVING END

CROSS-REFERENCE TO RELATED APPLICATIONS

This application is a U.S. national phase of PCT Application No. PCT/CN2011/071496, published as WO 2012/062070, filed Mar. 3, 2011 which claims priority to Chinese Application No. 201010538330.8 filed Nov. 9, 2010, the disclosures of which are incorporated in their entirety by reference herein.

TECHNICAL FIELD

The present invention relates to the field of communication technologies, and more especially, to a method, system and server for feeding back the state of a receiving end.

BACKGROUND OF THE RELATED ART

The mobile communication technologies can be described as developing every day, especially since the advent of the third generation mobile communication technology (3G), there is a new service after another. From the birth of the wireless terminal, the short message service (SMS), as one of the wireless terminal's basic functions, has always been one of the services most frequently used by the large number of mobile communication equipment owners.

However, when a user uses the short message service, he/she often encounters the following situation, that is, the user A sends a short message to the user B, but the user B might fail to reply a short message in time to the user A for the reasons such as that the user B is suspended, is powered off, or has no network signal, and the user A wants to obtain the current state of the user B automatically. At this time, it needs the network side to automatically feed back the current state of the user B to the user A.

In the existing SMS technology, one successful process of SMS sending and receiving is specifically as follows:

the mobile-services switching center (MSC) receives a Transfer Protocol Data Unit (TPDU) from the MS (Mobile Station) A, and queries the Visitor Location Register (VLR) for the mobile subscriber Integrated Services Digital Network (MSISDN) number corresponding to the MSA, and inserts the number into the protocol data unit (PDU) and then transmits the number to the Internetworking MSC for SMS (SMS-IWMSC). The MSC returns a report back to the MS according to the processing result. The SMS-IWMSC receives the TPDU that is from the MSA from the MSC, and checks the legitimacy of the SC address as the TPDU transmission destination, and then transmits the TPDU to the SC (Service Centre). The SMS-IWMSC returns a report to the MSC according to the processing result.

After the SC receives the TPDU, the Gateway MSC for SMS (SMS-GMSC) receives the TPDU from the SC and performs the parameter checking, and requires the HLR to perform the service authentication and inquiries the MSA for routing information, after the status is normal, routes the PDU to the MSC. The SMS-GMSC returns a report to the SC according to the processing result. After the MSC receives the TPDU from the SMS-GMSC, it queries the VLR of the MSB information, such as the location area information, and transmits the SMS to the MSB according to the query result. Moreover, the MSC returns a report back to the SMS-GMSC according to the processing result.

Therefore, after the SC successfully forwards the information sent by the MSA, it sends a status report to the MSA to inform the terminal that the short message has been forwarded successfully. However, after the SC forwards the message, information such as whether the message successfully reaches the MSB, and what the current state of the MSB is if the MSB did not respond the information is not fed back to the MSA by the network side. Therefore, it is necessary to study a method for feeding back the current state of the receiving end of the message.

SUMMARY OF THE INVENTION

In order to solve the aforementioned problem, the present invention provides a method, system and server for feeding back the state of a receiving end, in order to automatically feed back the current state of the receiving end to a first terminal in the case that the receiving end is suspended, powered off or has not registered.

The present invention provides a method for feeding back the state of a receiving end, the method comprising:

a server activating a function of feeding back state of the receiving end for a first terminal; and after said server receives a short message sent by the first terminal, the server sending the short message to the receiving end, if a short message sent by the receiving end to the first terminal is not received within a present time period since the server receives the short message sent by the first terminal, the server acquiring current state of the receiving end and feeding back to said first terminal.

Preferably, the step of the server activating the function of feeding back the state of the receiving end for the first terminal comprises:

said first terminal sending to said server a request for activating the function of feeding back the state of the receiving end;

after said server receives the request, it inquiring a home location register (HLR) whether the first terminal registers the function or not; if yes, the server activating the function of feeding back the state of the receiving end for the first terminal; otherwise, the server feeding back an activation failed message. Preferably, the step of the server acquiring the current state of the receiving end comprises:

said server sending a query request to a mobile-services switching center (MSC) to which the receiving end belongs;

the MSC to which the receiving end belongs querying a visited location register (VLR) of the current state of the receiving end according to said received query request;

said VLR feeding back the current state of said receiving end to the MSC to which the receiving end belongs; and the MSC to which the receiving end belongs feeding back the current state of the receiving end to the server.

Preferably, said server is located in a short message center.

The present invention also provides a system for feeding back the state of a receiving end, the system comprising a first terminal, a server and a receiving end, wherein:

the first terminal is set to send a short message to the server and receive current state of the receiving end fed back by the server;

the server is set to: activate a function of feeding back the state of the receiving end for the first terminal; and receive the short message sent by the first terminal and send the short message to the receiving end, if the short message fed back by the receiving end to the first terminal is not received in a preset time period from a moment of receiving the short message sent by the first terminal, obtain the current state of the receiving end and feed back the current state of the receiving end to said first terminal. Preferably, the first terminal is also set to send a request for activating the function of feeding back the state of the receiving end to the server;

the server is also set to: after the request from the first terminal is received, query the home location register (HLR) whether the first terminal registers the function of feeding back the state of the receiving end or not; if yes, activate the function of feeding back the state of the receiving end for the first terminal; otherwise, feed an activation failed message back.

Preferably, the system also comprises: a mobile-services switching center (MSC) to which the receiving end belongs and a visit location register (VLR), wherein, said server is also set to, send a query request to a mobile-services switching center MSC to which the receiving end belongs to obtain the current state of the receiving end;

the MSC to which the receiving end belongs is set to: query the visit location register (VLR) of the current state of the receiving end according to said received query request, and feed back the current state of the receiving end to the server;

said VLR is set to feed back the current state of said receiving end to the MSC to which the receiving end belongs.

Preferably, said server is located in a short message center.

The present invention also provides a server, and said server is set to: activate a function of feeding back state of a receiving end for a first terminal; and after receiving a short message sent by the first terminal, send the short message to the receiving end, if a short message fed back by said receiving end to the first terminal is not received in a preset time period from a moment of receiving the short message sent by the first terminal, obtain and feed back the current state of the receiving end to said first terminal.

Preferably, said server is located in the short message center.

In the method and system for feeding back the state of the receiving end in the present invention, the function of feeding back the state of the receiving end is activated for the first terminal through the server, enable the server obtain and feed back the current state of the receiving end to the first terminal in the case that the receiving end is suspended, powered off, or has not registered.

PREFERRED EMBODIMENTS OF THE PRESENT INVENTION

In the method and system for feeding back the state of the receiving end in the present invention, the function of feeding back the state of the receiving end is activated for the first terminal through the server, thereby enabling the server acquire and feed back the current state of the receiving end to the first terminal in the case that the receiving end is suspended, powered off, or has not registered.

Figure 1:
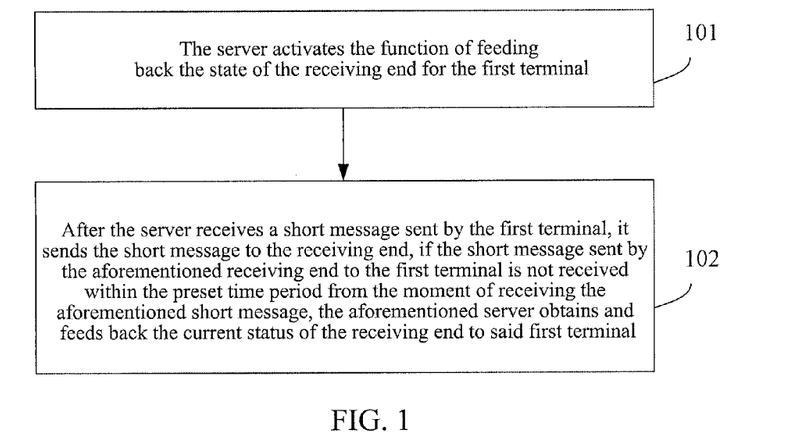
FIG. 1 is a flow chart of an embodiment of the method for feeding back the state the receiving end in the present invention.

FIG. 1 is a flow chart of the method embodiment for feeding back the state of the receiving end in the present invention, the method comprising:

step 101, the server activates the function of feeding back the state of the receiving end for the first terminal;

step 102, after the server receives a short message sent by the first terminal, it sends the short message to the receiving end, if the short message sent by the aforementioned receiving end to the first terminal is not received within the preset time period from the moment of receiving the short message sent by the first terminal, the aforementioned server obtains and feeds back the current status of the receiving end to said first terminal.

Specifically, if the server does not receive the feedback information of the aforementioned short message from the receiving end, or the destination address is not the first terminal in the received feedback information sent from the receiving end, the server automatically obtains and feeds back the current state of the receiver to the first terminal.

If the server receives a second message from the receiving end, it determines that the short message from the first terminal successfully reaches the receiving end.

The aforementioned server may be located in the short message center.

Figure 2:
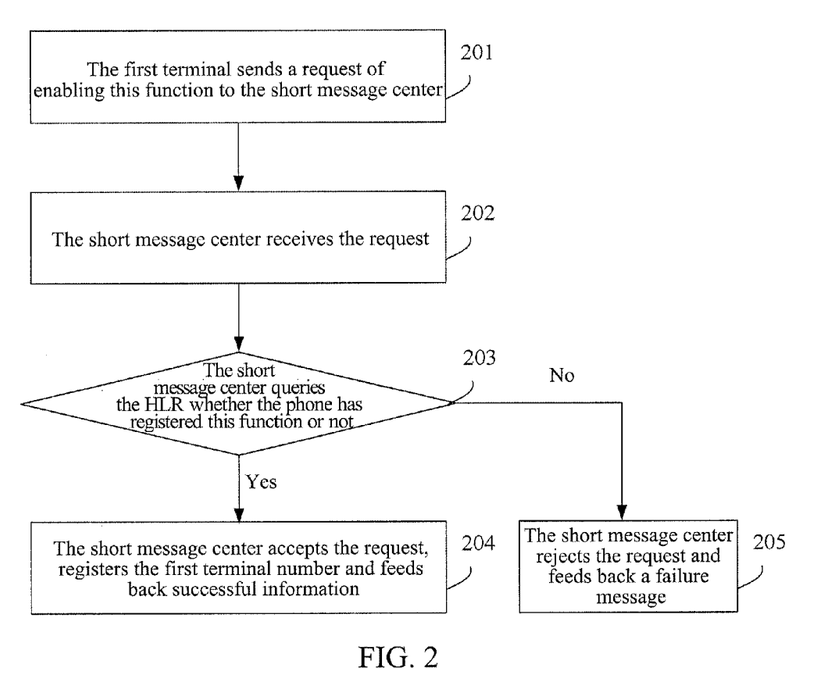
FIG. 2 is a flow chart of an embodiment of the first terminal applying to activate the function of feeding back the state of the receiving end in the present invention.

In the aforementioned step 101, the process embodiment of the server activating the function of feeding back the state of the receiving end for the first terminal is shown in FIG. 2, and the process specifically comprises:

step 201, the first terminal sends a request of enabling this function to the short message center;

step 202, the short message center receives the request;

step 203, the short message center queries the Home Location Register (HLR) whether the phone has registered this function or not, if yes, proceed to step 204; otherwise, proceed to step 205;

if the first terminal has registered this function, it can choose to activate (that is, successful enabled the function), or temporarily not activate the feature (that is, temporarily not enable the function), but if the first terminal did not register the function, this function cannot be activated, that is, this function cannot be enabled successfully.

Step 204, the short message center accepts the request, registers the number of the first terminal and feeds back a successful information; and end;

step 205, the short message center rejects the request and feeds back a failure message.

After this function is successfully activated, the first terminal can include its identification information into the message that the first terminal sends to the server.

In the short message protocol specification, the TPUD is defined as the protocol data unit directly bearing the short message application layer data transmitted between the MS and the SC. There are six kinds of TPUD, namely: the SM- DELIVER, the SMS-DELIVER-REPORT, the SM-SUBMIT, the SMS-SUBMIT-REPORT, the SMS-COMMAND and the SMS-STATUS-REPORT.

The SM-SUBMIT is the TPDU in the MS→SC direction, its basic information elements comprise: the transfer protocol short message type identifier (TP-MTI), the TP-RD (the short message indicating whether the short message center repeatedly receives the same sender address and receiver address), the TP-VPF (indicating whether the validity is valid or not), the TP-RP (indicating that a response path is required), the TP-UDHI (indicating that the TP-UD field contains header information), the TP-SRR (indicating whether it needs a status report or not), the TP-MR (indicating to send a short message), the TP-DA (indicating the address of the destination SME), the TP-PID (indicating the protocol of the upper layer), the TP-DCS (indicating the encoding method of user data), the TP-VP (indicating the validity of the short message), the TP-UDL (indicating the length of the user data) and the TP-UD (indicating the user data, that is, the short message content), these information elements define what information contained in the TPDUs in the MS to the SC direction, such as the TPUD type, the short message destination address, and so on, and in order to be distinguished with this information, a new information element TP-SRTR is defined in the SM-SUBMIT information elements to identify whether the information sent by the terminal to the SC enables the function of feeding back the state of the receiving end or not; that is, the TP-SRTR is the identification information mentioned in the aforementioned method embodiment; Of course, a person of ordinary skill in the field can achieve this feature by adding other new information elements, and the TP-SRTR in this embodiment is an example only.

Figure 3:
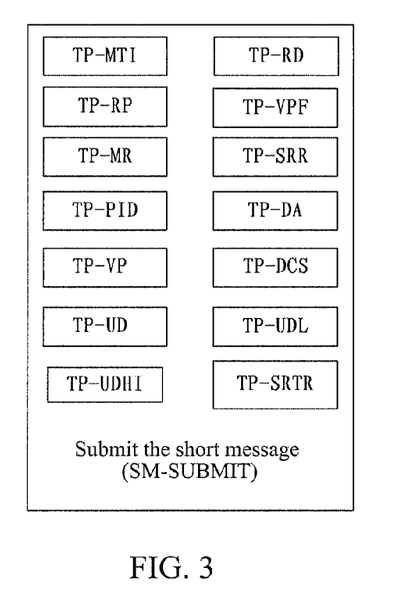
FIG. 3 is a schematic diagram of a capability format provided in the present invention.

Combined with the analysis of the aforementioned SM-SUBMIT information element, FIG. 3 provides a schematic diagram of a capability format provided in the present invention.

Figure 4:
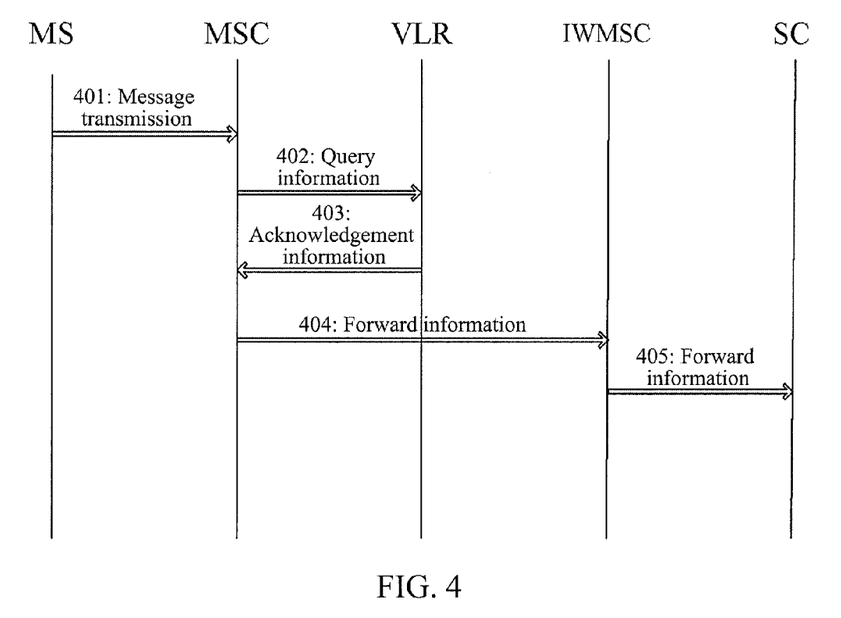
FIG. 4 is a flow chart of an embodiment of the source terminal provided in the present invention sending a short message to the short message center.

FIG. 4 shows a flow chart of the source terminal sending a short message to the short message center provided in the present invention, the MS mentioned in this embodiment is the source terminal, and the process comprises the following steps.

Step 401, the MS sends a short message to the MSC.

The short message might comprise: the SMS content, the destination SC address, and the identification information indicating whether to activate the function of feeding back the state of the receiving end.

Step 402, the MSC queries the VLR whether the MS can send a short message or not.

Step 403, the VLR feeds back the related information to the MSC.

If the MS can send short messages properly, the MSISDN number would be provided.

Step 404, if the MS can send a short message properly, the MSC forwards the short message to the IWMSC.

The short message comprises the SMS content, the MSISDN number of the source MS, the destination SC address, as well as the information indicating whether the source MS activates the function or not.

Step 405, the IWMSC forwards the short message to the SC.

The short message comprises the SMS content, the MSISDN number of the first terminal, the destination SC address, and the information indicating whether the first terminal MS activates the function or not.

At this point, the SC successfully receives the short message sent by the first terminal, and it should be noted that, the SC needs to record whether the first terminal activates the function or not, and the time TimeA that the short message of the first terminal arrives at the SC.

Figure 5:
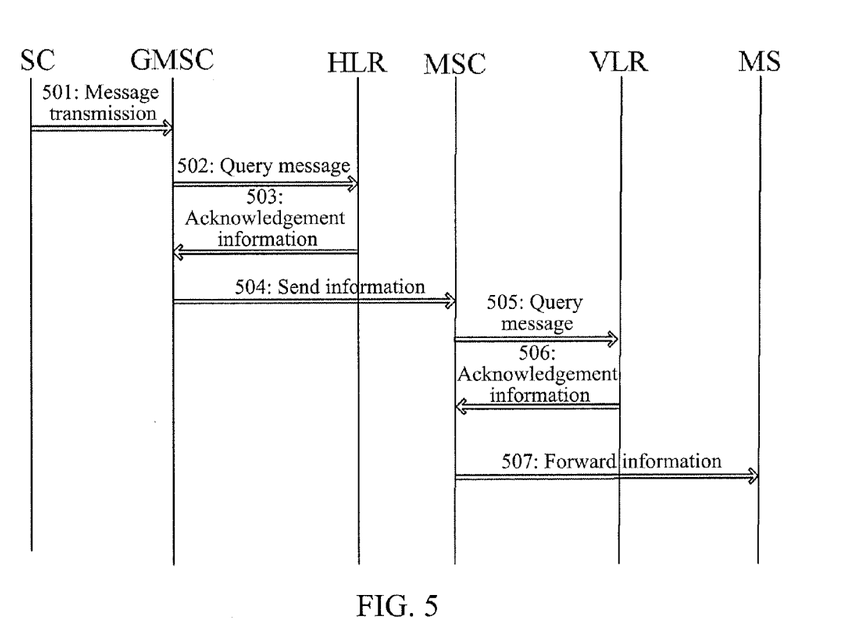
FIG. 5 is a flow chart of an embodiment of the short message service center provided in the present invention sending a short message to the destination terminal.

After the SC successfully receives the short message sent by the first terminal, it might send the short message to the receiving end (the destination terminal), as shown in FIG. 5, which is a flow chart of an embodiment of the short message service center provided in the present invention sending a short message to the destination terminal, and the process comprises:

step 501, the SC sends a short message to the gateway mobile switching center (GMSC);

step 502, the GMSC queries the HLR to which the destination terminal belongs about the routing information;

step 503, the HLR returns an acknowledgement message;

if the query is successful, the returned routing information comprises the MSC number in which the destination MS is located, as well as the international mobile subscriber identifier (IMSI) of the destination end-user, and the Local Mobile Subscriber Identity (LMSI);

step 504, the GMSC sends a short message to the MSC;

the GMSC needs to send a short message to the destination MSC according to the obtained routing information, and the short message comprises the SMS content, the source SC address, the IMSI or LMSI of the destination MS;

step 505, the MSC queries the VLR about the related information of the destination MS;

step 506, the VLR returns an acknowledgement message to the MSC;

step 507, the MSC forwards the short message to the destination MS.

At this point, the SC successfully forwards the short message sent from the source MS (the first terminal) to the destination MS (the receiving end).

In addition, the embodiment of the source terminal sending a short message to the short message center and the embodiment of the short message service center sending the short message to the destination terminal can be combined into one embodiment, that is, the embodiment of the short message service center sending the short message of the source terminal to the destination terminal.

After the SC successfully forwards the short message sent from the source MS to the destination MS, it also needs to feed back whether the short message has been successfully reached the destination MS or not to the source MS, if the short message is not reached successfully, it also needs to feed back the current state of the destination MS to the source MS.

In the embodiment of the mobile station sending a short message to the short message center, it has already explained that, if the information element sent by the source terminal comprises the identification information indicating that the function of feeding back the state of the receiving end has been successfully activated, after the SC receives the short message sent by the source terminal, it records the time point TimeA that the short message arrives and the source terminal number. Thus, if when the current time-TimeA>TimeB, the source terminal does not reply the short message yet, the SC starts to obtain the current state of the destination MS; wherein, the TimeB is a preset time period which can be adjusted dynamically as needed.

Figure 6:
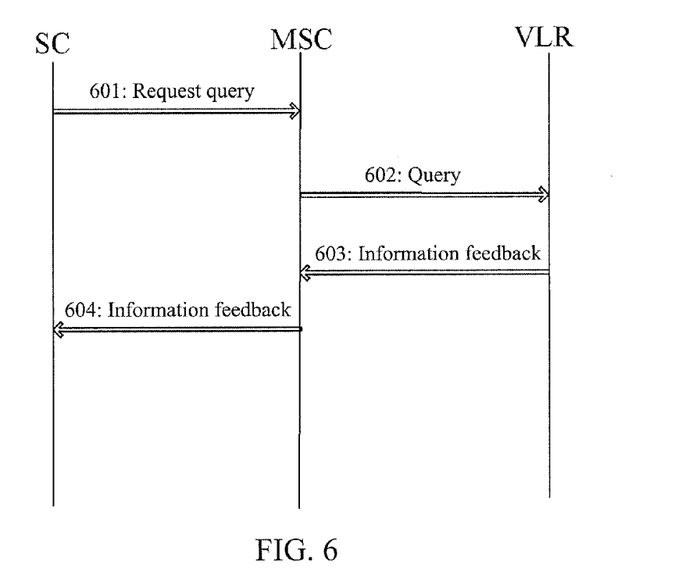
FIG. 6 is a flow chart of an embodiment of the short message service center provided in the present invention obtaining the current state of the destination terminal.
Figure 7:
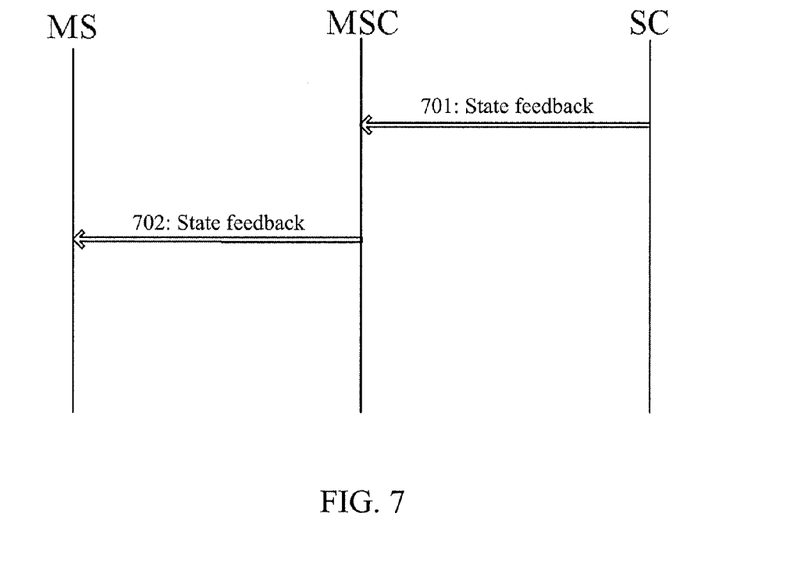
FIG. 7 is a flow chart of an embodiment of the short message service center provided in the present invention feeding back the current state of the peer terminal to the mobile station.

FIG. 6 shows a flow chart of an embodiment of the short message service center provided in the present invention obtaining the current state of the destination terminal, and the process comprises:

step 601, the SC initiates a query request to the MSC to which the destination terminal belongs;

the SC might directly initiate a query request to the MSC to which the destination terminal belongs according to the MSC number of the destination terminal in the HLR routing information, and the request comprises the source terminal number and the destination terminal number;

step 602, the MSC to which the destination terminal belongs queries the VLR of the current state of the destination MS;

what the VLR saves is the dynamic information and status information of the user, and the subscription information downloaded from the HLR. When the MSC queries the VLR of the related information of the destination MS, the VLR can report the relevant information to the MSC; wherein, the aforementioned relevant information comprises information such as whether the MS subscribes the SMS service or not, whether the MS is roaming, or whether the MS has been powered off, whether it has been suspended, and so on;

step 603, the VLR feeds back the current state of the destination MS to the MSC to which the destination MS belongs;

step 604, the MSC to which the destination terminal belongs feeds back the current state of the destination MS to the SC;

at this point, the SC has acquired the current state of the destination MS, thereafter, the SC can forward the obtained current state of the destination MS to the source MS. FIG. 7 shows a flow chart of the embodiment of the short message service center provided in the present invention feeding back the current state of the destination terminal to the source terminal, and the process comprises:

step 701, the SC feeds back the obtained current state of the destination terminal to the MSC corresponding to the source terminal;

after the SC obtains the current state of the destination terminal, it feeds back the current state of the destination terminal, the destination terminal number and the source terminal number to the MSC corresponding to the source terminal;

step 702, the MSC corresponding to the source terminal feeds back the current state of the destination terminal to the source terminal.

After the MSC corresponding to the source terminal receives the information sent by the SC, it feeds back the current state of the destination terminal to the source terminal according to the source terminal number.

At this point, the SC completes forwarding the current state of the destination terminal to the source terminal.

In addition, the embodiment of the source terminal sending a short message to the short message center and the embodiment of the short message service center sending the short message to the destination terminal can be combined into one embodiment, that is, the embodiment of the short message service center sending the short message of the source terminal to the destination terminal.

It should be noted that the first terminal in this embodiment is the source terminal, and the receiving end is the destination terminal.

The method for feeding back the state of the receiving end in the present invention enables the server obtain and feed back the current state of the receiving end to the first terminal in the case that the receiving end is suspended, powered off, or has not registered through the server activating the function of feeding back the state of the receiving end for the first terminal.

Figure 8:
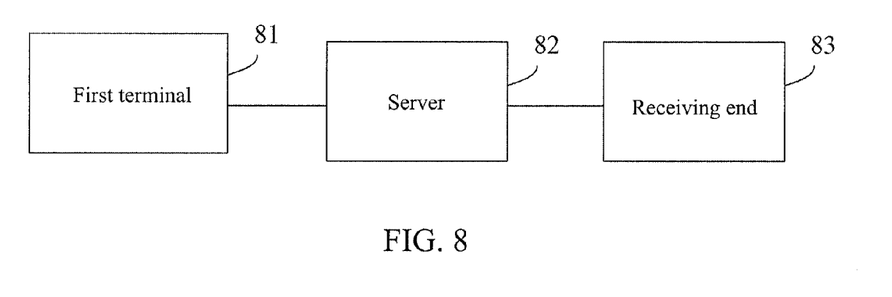
FIG. 8 is a structure diagram of an embodiment of the system for feeding back the state of the receiving end in the present invention.

FIG. 8 shows a structure diagram of the system for feeding back the state of the receiving end in the present invention, the system comprises the first terminal 81, the server 82 and the receiving end 83, wherein: the first terminal is set to send a short message to the server and receive the current state of the receiving end fed back by the server; the server is set to: activate the function of feeding back the state of the receiving end for the first terminal; receive the short message sent by the first terminal and send it to the receiving end, and if the short message sent by the receiving end to the first terminal is not received in a preset time period from the moment of receiving said short message sent, obtain and feed back the current state of the receiving end to said first terminal.

Said first terminal is also set to send a request for activating the function of feeding back the state of the receiving end to the server; said server is also set to: after the request is received, query the home location register (HLR) whether the first terminal registers the function or not; if yes, activate the function of feeding back the state of the receiving end for the first terminal; otherwise, feed back an activation failed message.

In addition, the system might also comprise: a mobile-services switching center (MSC) to which the receiving end belongs and a visitor location register (VLR), and the aforementioned server might also comprise an acquisition module, wherein, the acquisition module of the server is set to, send a query request to the MSC to which the receiving end belongs so as to obtain the current state of the receiving end; the query module of the MSC to which the receiving end belongs is set to: query the visit location register (VLR) of the current state of the receiving end according to said received query request; the aforementioned VLR may be set to feed back the current state of the receiving end to the MSC to which the receiving end belongs; the feeding back module of the MSC to which the receiving end belongs is set to feed back the current state of the receiving end to the server.

Preferably, the aforementioned server is located in the short message center.

The system for feeding back the state of the receiving end in the present invention enables the server obtain and feed back the current state of the receiving end to the first terminal in the case that the receiving end is suspended, powered off, or has not registered through the server activating the function of feeding back the state of the receiving end for the first terminal.

The present invention also provides a server, said server is set to: activate the function of feeding back the state of the receiving end for the first terminal; and receive and send the short message sent by the first terminal to the receiving end, if the short message sent by the receiving end to the first terminal is not received in a preset time period from the moment of receiving the short message, obtain and feed back the current state of the receiving end to said first terminal.

Preferably, said server is located in the short message center or the MMS.

The function of this server is the same as the function of the server in the system embodiment for feeding back the state of the receiving end and is not repeated here.

The server can obtain and feed back the current state of the receiving end to the first terminal in the case that the receiving end is suspended, powered off, or has not registered through the server activating the function of feeding back the state of the receiving end for the first terminal.

The person of ordinary skill in the art can understand that all or part of the steps in the aforementioned method can be implemented by the program instructing the related hardware, the program can be stored in a computer readable storage medium, such as read-only memory, disk, or CD-ROM. Optionally, all or part of the steps in the aforementioned embodiments can also be implemented with one or more integrated circuits, and accordingly, each module/unit in the above embodiments can be implemented in the form of hardware or software functional modules. The present invention is not limited to any particular form of hardware and software combination.

The above description is only the preferred embodiments of the present invention, it should be noted that for a person of ordinary skill in the art, a variety of improvements and polishes can be made within departing from the principles of the present invention, and these improvements and polishes should be included within the protection scope of the present invention.

INDUSTRIAL APPLICABILITY

Compared with the prior art, in the present invention, the server activates the function of feeding back the state of the receiving end for the first terminal so that the server can obtain and feed back the current state of the receiving end to the first terminal in the case that the receiving end is suspended, powered off, or has not registered.

What is claimed is:

1. A method for feeding back the state of a receiving end, the method comprising:
   a server activating a function of feeding back the state of the receiving end for a first terminal, and defining an information element, TP-SRTR, to identify whether an information sent by the first terminal to a service center enables the function of feeding back the state of the receiving end or not in SM-SUBMIT information elements, where said TP-SRTR information element is contained in a short message sent by the first terminal to a service center; and
   after said server receives the short message sent by the first terminal for which the function of feeding back the state of the receiving end has been activated, the server sending the short message to the receiving end, if a short message sent by the receiving end to the first terminal is not received within a present time period since the server receives the short message sent by the first terminal, the server acquiring the current state of the receiving end, which is suspended, powered off, or not registered, and feeding the current state back to said first terminal.

2. The method for feeding back the state of a receiving end of claim 1 wherein the step of the server activating the function of feeding back the state of the receiving end for the first terminal comprises:
   said first terminal sending to said server a request for activating the function of feeding back the state of the receiving end;
   after said server receives the request, inquiring a home location register (HLR) whether the first terminal registers the function or not; if yes, the server activating the function of feeding back the state of the receiving end for the first terminal; otherwise, the server feeding back an activation failed message.

3. The method for feeding back state of a receiving end of claim 1 wherein the step of the server acquiring the current state of the receiving end comprises:
   said server sending a query request to a mobile-services switching center (MSC) to which the receiving end belongs;
   the MSC to which the receiving end belongs querying a visited location register (VLR) of the current state of the receiving end according to said received query request;
   said VLR feeding back the current state of said receiving end to the MSC to which the receiving end belongs; and the MSC to which the receiving end belongs feeding back the current state of the receiving end to the server.

4. The method for feeding back the state of a receiving end of claim 1 wherein said server is located in a short message center.

5. A system for feeding back the state of a receiving end, the system comprising a first terminal, a server, and a receiving end, wherein:
   the first terminal is set to send a short message to the server, said short message containing an information element, TP-SRTR, which is defined in SM-SUBMIT information elements to identify whether a function of feeding back a state of the receiving end is enabled or not by the TP-SRTR information element sent by the first terminal to a service center, and receive the current state of the receiving end fed back by the server;
   the server is set to: activate a function of feeding back the state of the receiving end for the first terminal; and receive the short message sent by the first terminal to a service center for which the function of feeding back the state of the receiving end has been activated and send the short message to the receiving end, if the short message fed back by the receiving end to the first terminal is not received in a preset time period from a moment of receiving the short message sent by the first terminal, obtain the current state of the receiving end, which is suspended, powered off, or not registered, and feed back the current state of the receiving end to said first terminal.

6. The system for feeding back the state of a receiving end of claim 5 wherein,
   the first terminal is also set to send a request for activating the function of feeding back the state of the receiving end to the server;
   the server is also set to: after the request from the first terminal is received, query the home location register (HLR) whether the first terminal registers the function of feeding back the state of the receiving end or not; if yes, activate the function of feeding back the state of the receiving end for the first terminal; otherwise, feed back an activation failed message.

7. The system for feeding back the state of a receiving end of claim 5 wherein, the system also comprises: a mobile-services switching center (MSC) to which the receiving end belongs and a visit location register (VLR),
   said server is also set to send a query request to a mobile-services switching center MSC to which the receiving end belongs to obtain the current state of the receiving end;
   the MSC to which the receiving end belongs is set to query the visit location register (VLR) of the current state of the receiving end according to said received query request and feed back the current state of the receiving end to the server; and
   said VLR is set to feed back the current state of said receiving end to the MSC to which the receiving end belongs.

8. The system for feeding back the state of a receiving end of claim 5 wherein said server is located in a short message center.

9. A short message server comprising a processor which is set to activate a function of feeding back state of a receiving end for a first terminal,
   and, after receiving a short message containing an information element, TP-SRTR, defined in SM-SUBMIT information elements and identifying that a function of feeding back a state of the receiving end is enabled by the TP-SRTR information element sent by the first terminal to a service center, which short message is sent by the first terminal to a service center, send the short message to the receiving end, and, if a short message fed back by said receiving end to the first terminal is not received in a preset time period from a moment of receiving the short message sent by the first terminal to a service center, obtain and feed back the current state, which is suspended, powered off or not registered, of the receiving end to said first terminal.

\* \* \* \* \*